(12) United States Patent
Kakiuchi et al.

(10) Patent No.: US 9,327,339 B2
(45) Date of Patent: May 3, 2016

(54) ELEMENT BLANKING APPARATUS AND METHOD

(75) Inventors: Miyoshi Kakiuchi, Tahara (JP); Koji Fujimoto, Tahara (JP); Yoshiaki Sato, Anjo (JP); Masaki Nakajima, Anjo (JP)

(73) Assignees: AISIN AW CO., LTD., Anjo (JP); CVTEC CO., LTD., Tahara-shi (JP)

( * ) Notice: Subject to any disclaimer, the term of this patent is extended or adjusted under 35 U.S.C. 154(b) by 10 days.

(21) Appl. No.: 14/372,410

(22) PCT Filed: Feb. 13, 2012

(86) PCT No.: PCT/JP2012/053227
§ 371 (c)(1),
(2), (4) Date: Jul. 15, 2014

(87) PCT Pub. No.: WO2013/121500
PCT Pub. Date: Aug. 22, 2013

(65) Prior Publication Data
US 2014/0352387 A1    Dec. 4, 2014

(51) Int. Cl.
*B21D 53/14* (2006.01)
*B21D 28/08* (2006.01)
*F16G 5/16* (2006.01)

(52) U.S. Cl.
CPC .............. *B21D 53/14* (2013.01); *B21D 28/08* (2013.01); *F16G 5/16* (2013.01)

(58) Field of Classification Search
CPC ......... B21D 53/14; B21D 28/02; B21D 28/08
See application file for complete search history.

(56) References Cited

U.S. PATENT DOCUMENTS

2001/0049314 A1  12/2001  Suzuki
2002/0138986 A1  10/2002  Wakui
2004/0048707 A1   3/2004  Suzuki

FOREIGN PATENT DOCUMENTS

| EP | 1132648 A1 | 9/2001 |
|---|---|---|
| EP | 1158203 A1 | 11/2001 |
| JP | A-2002-018536 | 1/2002 |
| JP | A-2002-048195 | 2/2002 |
| JP | A-2005-088025 | 4/2005 |
| JP | A-2005-517533 | 6/2005 |
| JP | 2006043719 A | 2/2006 |
| JP | A-2006-192459 | 7/2006 |
| JP | B2-4132820 | 6/2008 |
| JP | B2-4390374 | 10/2009 |
| JP | 2010137240 A | 6/2010 |
| WO | WO 01/78919 A1 | 10/2001 |
| WO | WO 03/069185 A1 | 8/2003 |

OTHER PUBLICATIONS

Jul. 15, 2015 Extended European Search Report issued in European Patent Application No. 12868369.5.

*Primary Examiner* — Teresa M Ekiert
(74) *Attorney, Agent, or Firm* — Oliff PLC

(57) ABSTRACT

An apparatus configured to make blanks that would be used to assemble a CVT belt formed from such blanks. The CVT is assembled by arrange a body portion of the blanks on an inner periphery, a head portion on an outer periphery, and a neck portion, which connects the head and body. The apparatus has a die that has an opening shape conforming to a planar shape of the element to be formed. An ejector that has a sectional shape conforming to the opening shape of the blanking blade and is located inside the blanking blade. A punch that has a sectional shape conforming to the opening shape of the blanking blade and moves downward into the blanking blade to blank the element together with the blanking blade, and a pusher that is located around the punch and presses the flat plate-like material against the die.

6 Claims, 7 Drawing Sheets

ELEMENT BLANKING APPARATUS AND METHOD

TECHNICAL FIELD

The present invention relates to element blanking apparatuses and methods for blanking a CVT belt element from a flat plate-like material.

BACKGROUND ART

CVT belts (belts for use in continuously variable transmissions) are formed by positioning a large number of metal elements with respect to each other and arranging the elements around the entire circumference of a hoop as a metal strip formed into a ring shape. Since the CVT belt is wound around pulleys and rotated, the rotation radius obtained by the arrangement of the large number of elements need be designed so that the inner peripheral portions of body portions located on the inner periphery of the hoop have a smaller rotation radius than the portions of the body portions which are located radially outward of the inner peripheral portions. Accordingly, the elements are formed so that the inner peripheral portions of the body portions have a smaller thickness than the remaining portions thereof.

Conventionally, a long strip-shaped material that is used to blank the elements is produced in advance so that its lateral region where the inner peripheral portions of the body portions are to be formed has a smaller thickness than its lateral region where the remaining normal thickness portions of the body portions are to be formed (see, e.g., Patent Documents 1 and 2).

For example, Patent Document 3 discloses that the sectional shape of a V-block (element) press material is formed so as to have substantially the same width in the outer peripheral portions of V-blocks and so as to be tapered toward the inner peripheral ends of the V-blocks from a position located at a predetermined distance from locking edges toward the inner peripheries of the V-blocks.

RELATED ART DOCUMENTS

Patent Documents

Patent Document 1: Japanese Patent Application Publication No. 2005-88025 (JP 2005-88025 A)
Patent Document 2: Japanese Patent No. 4390374 (JP 4390374)
Patent Document 3: Japanese Patent No. 4132820 (JP 4132820)

SUMMARY OF THE INVENTION

Problem to be Solved by the Invention

In Patent Document 2 as well, however, a long strip-shaped material as a V-block press material that is used to blank V-blocks is formed in advance so that its lateral region where the inner peripheral portions of the body portions are to be formed has a gently tapered thickness toward the inner peripheral ends thereof.

Accordingly, the long strip-shaped material need be produced in advance so as to have a transverse section having a stepped shape or a transverse section shaped to have a linear portion and a tilted portion. This is not advantageous in terms of productivity such as reduction in cost for the strip-shaped material.

The present invention was developed in view of the above conventional problems, and it is an object of the present invention to provide an element blanking apparatus and method capable of successively performing formation of a reduced thickness portion and blanking of an element, and capable of achieving improved productivity such as reduction in cost associated with production of flat plate-like materials.

Means for Solving the Problem

A first invention is an element blanking apparatus for blanking from a flat plate-like material a CVT belt element that is formed by a body portion to be placed on an inner periphery of a CVT belt hoop, a head portion to be placed on an outer periphery of the CVT belt hoop, and a neck portion connecting the head portion and the body portion at a central position, characterized by including: a die having a blanking blade that has an opening shape conforming to a planar shape of the element to be formed; an ejector that has a sectional shape conforming to the opening shape of the blanking blade and is located inside the blanking blade; a punch that has a sectional shape conforming to the opening shape of the blanking blade and moves downward into the blanking blade to blank the element together with the blanking blade; and a pusher that is located around the punch and presses the flat plate-like material against the die, wherein an upper surface of the ejector has a body portion-side upper surface portion in a region that is located on one side in a lateral direction and that is used to form the body portion, and a head portion-side upper surface portion in a region that is located on the other side in the lateral direction and that is used to form the head portion and the neck portion, the body portion-side upper surface portion has a raised surface in a region located on the one side in the lateral direction, and the raised surface is raised with respect to a region of the body portion-side upper surface portion which is located on the other side in the lateral direction, and the element blanking apparatus moves the punch downward to press the flat plate-like material by the punch and the ejector, and thus forms a reduced thickness portion in the flat plate-like material by the body portion-side upper surface portion, then moves the pusher downward to press the flat plate-like material against the die by the pusher, and subsequently blanks the element by the punch and the blanking blade.

A second invention is an element blanking method for blanking from a flat plate-like material a CVT belt element that is formed by a body portion to be placed on an inner periphery of a CVT belt hoop, a head portion to be placed on an outer periphery of the CVT belt hoop, and a neck portion connecting the head portion and the body portion at a central position, characterized in that the method uses a die having a blanking blade that has an opening shape conforming to a planar shape of the element to be formed, an ejector that has a sectional shape conforming to the opening shape of the blanking blade and is located inside the blanking blade, a punch that has a sectional shape conforming to the opening shape of the blanking blade and moves downward into the blanking blade to blank the element together with the blanking blade, and a pusher that is located around the punch and presses the flat plate-like material against the die, an upper surface of the ejector has a body portion-side upper surface portion in a region that is located on one side in a lateral direction and that is used to form the body portion, and a head portion-side upper surface portion in a region that is located on the other side in the lateral direction and that is used to form the head portion and the neck portion, the body portion-side upper surface portion has a raised surface in a region located on the one side in the lateral direction, and the raised surface is raised with respect to a region of the body portion-side upper surface portion which is located on the other side in the lateral direction, and the punch is moved downward to press the flat plate-like material by the punch and the ejector so as to form a reduced thickness portion in the flat plate-like material by the body portion-side upper surface portion, the pusher is then moved downward to press the flat plate-like material against the die by the pusher, and the element is subsequently blanked by the punch and the blanking blade.

Effects of the Invention

In the element blanking apparatus according to the first invention, the shape of the upper surface of the ejector is designed so that formation of the reduced thickness portion as a portion having a reduced thickness with respect to a normal thickness portion and blanking of the planar shape of the element can be successively performed.

Specifically, the upper surface of the ejector has the body portion-side upper surface portion and the head portion-side upper surface portion, the body portion-side upper surface portion has the raised surface in the region located on the one side in the lateral direction, and the raised surface is raised with respect to the region of the body portion-side upper surface portion which is located on the other side in the lateral direction.

Accordingly, the reduced thickness portion having a reduced thickness with respect to the normal thickness portion can be formed in the flat plate-like material by the body portion-side upper surface portion when the punch is moved downward and the flat plate-like material is pressed by the punch and the ejector. The flat plate-like material is pressed against the die by the pusher, and the element can be blanked by the punch and the blanking blade in succession to formation of the reduced thickness portion.

Therefore, formation of the reduced thickness portion as a varied thickness portion and blanking of the element can be successively performed in the single element blanking apparatus. A material having a substantially uniform overall thickness can be used as the flat plate-like material. This can achieve improved productivity such as reduction in cost associated with production of the flat plate-like material.

Moreover, a region around the punch is not pressed by the pusher during formation of the reduced thickness portion. This makes it easier for a part of the flat plate-like material, which is pressed to flow upon formation of the reduced thickness portion, to flow in the lateral direction to the region around the punch. The reduced thickness portion can thus be formed without applying an excessive load to the die.

As used herein, the "one side in the lateral direction" refers to one side in the direction perpendicular to the downward direction in which the punch and the pusher are moved. The "other side in the lateral direction" refers to the opposite side to the one side in the lateral direction.

In the element blanking method of the second invention as well, formation of the reduced thickness portion as a varied thickness portion and blanking of the element can be successively performed. A material having a substantially uniform overall thickness can be used as the flat plate-like material. This can achieve improved productivity such as reduction in cost associated with production of the flat plate-like material. Moreover, as described above, a part of the flat plate-like material can easily flow in the lateral direction, and the reduced thickness portion can thus be formed without applying an excessive load to the die.

MODES FOR CARRYING OUT THE INVENTION

Figure 1:
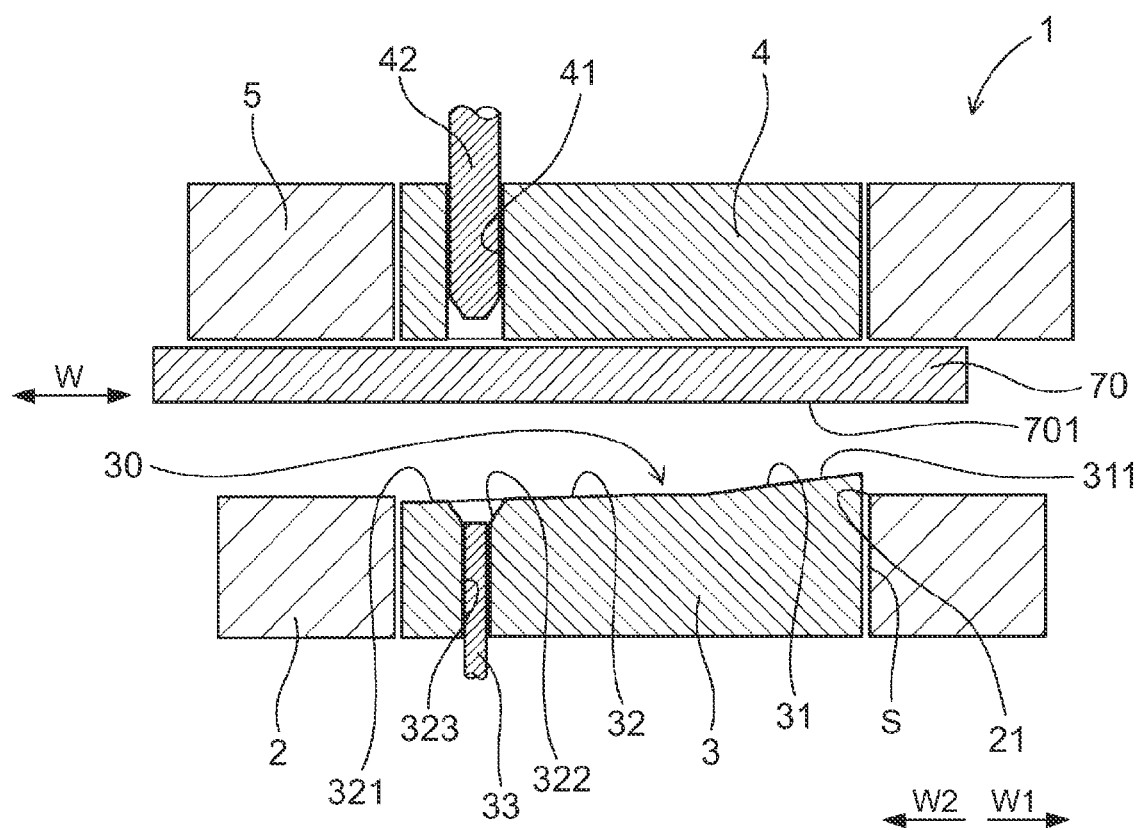
FIG. 1 is a sectional view showing an element blanking apparatus in which a punch and a pusher are located at their original positions according to an embodiment.

A preferred mode for carrying out the element blanking apparatus and method according to the first and second inventions will be described.

In the first invention, it is preferable that the raised surface be formed so as to be tilted upward toward the one side in the lateral direction, and the reduced thickness portion be formed so that a thickness thereof gradually decreases toward the one side in the lateral direction.

In the second invention, it is preferable that the raised surface be formed so as to be tilted upward toward the one side in the lateral direction, and the reduced thickness portion be formed so that a thickness thereof gradually decreases toward the one side in the lateral direction.

In these cases, a part of the flat plate-like material can more easily flow toward the one side in the lateral direction upon formation of the reduced thickness portion. This facilitates formation of the reduced thickness portion.

In the first invention, it is preferable that the head portion-side upper surface portion have a lowered surface in a region located on the other side in the lateral direction, the lowered surface be tilted downward toward the other side in the lateral direction, and the lowered surface face a lower surface of the flat plate-like material when the body portion-side upper surface portion contacts the lower surface of the flat plate-like material and the ejector is tilted in a clearance between the ejector and the blanking blade so as to be lowered on the one side in the lateral direction.

In the second invention, it is preferable that the head portion-side upper surface portion have a lowered surface in a region located on the other side in the lateral direction, the lowered surface be tilted downward toward the other side in the lateral direction, and the lowered surface be caused to face a lower surface of the flat plate-like material when the body portion-side upper surface portion contacts the lower surface of the flat plate-like material and the ejector is tilted in a clearance between the ejector and the blanking blade so as to be lowered on the one side in the lateral direction.

In these cases, when the body portion-side upper surface portion of the ejector contacts the lower surface of the flat plate-like material and the ejector is tilted in the clearance between the ejector and the blanking blade so as to be lowered on the one side in the lateral direction, an angled portion located on the other side in the lateral direction of the head portion-side upper surface portion does not contact the lower surface of the flat plate-like material. This can prevent variation in thickness of the head portion of the element due to the contact of the angled portion with the lower surface of the flat plate-like material.

In the second invention, it is preferable that the flat plate-like material be a long strip-shaped material that is continuously fed between the die and the ejector and the punch and the pusher, a plurality of the elements be blanked in two rows with their head portions facing inward in a lateral direction of the long strip-shaped material, and the long strip-shaped material be caused to partially escape into its outer end in the lateral direction upon formation of the reduced thickness portion.

In this case, a part of the long strip-shaped material can be made to easily flow into the outer end in the lateral direction (the end on the one side in the lateral direction) when an angled portion of the raised portion of the body portion-side upper surface portion, which is located on the one side in the lateral direction, presses the lower surface of the long strip-shaped material to form the reduced thickness portion.

Embodiment

An embodiment of the element blanking apparatus and method according to the present invention will be described with reference to the accompanying drawings.

Figure 9:
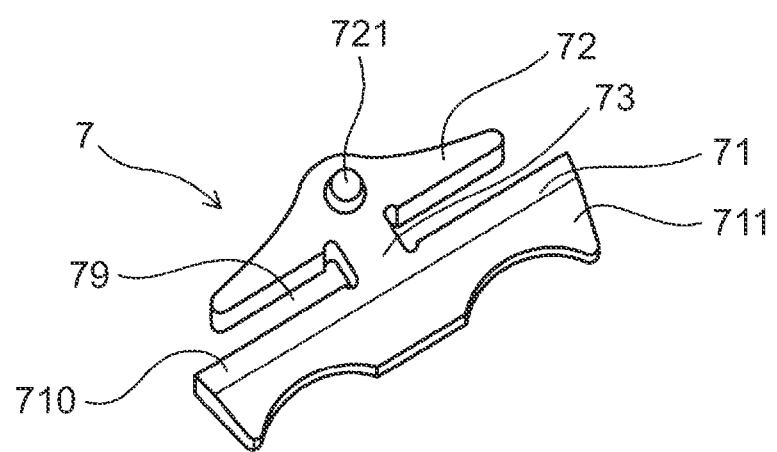
FIG. 9 is a perspective view showing the element according to the embodiment.

As shown in FIGS. 1 and 9, an element blanking apparatus 1 of the present embodiment blanks from a flat plate-like material 70 a CVT belt element 7 that is formed by a body portion 71 to be placed on the inner periphery of a CVT belt hoop 81, a head portion 72 to be placed on the outer periphery of the CVT belt hoop 81, and a neck portion 73 connecting the head portion 72 and the body portion 71 at a central position.

Figure 6:
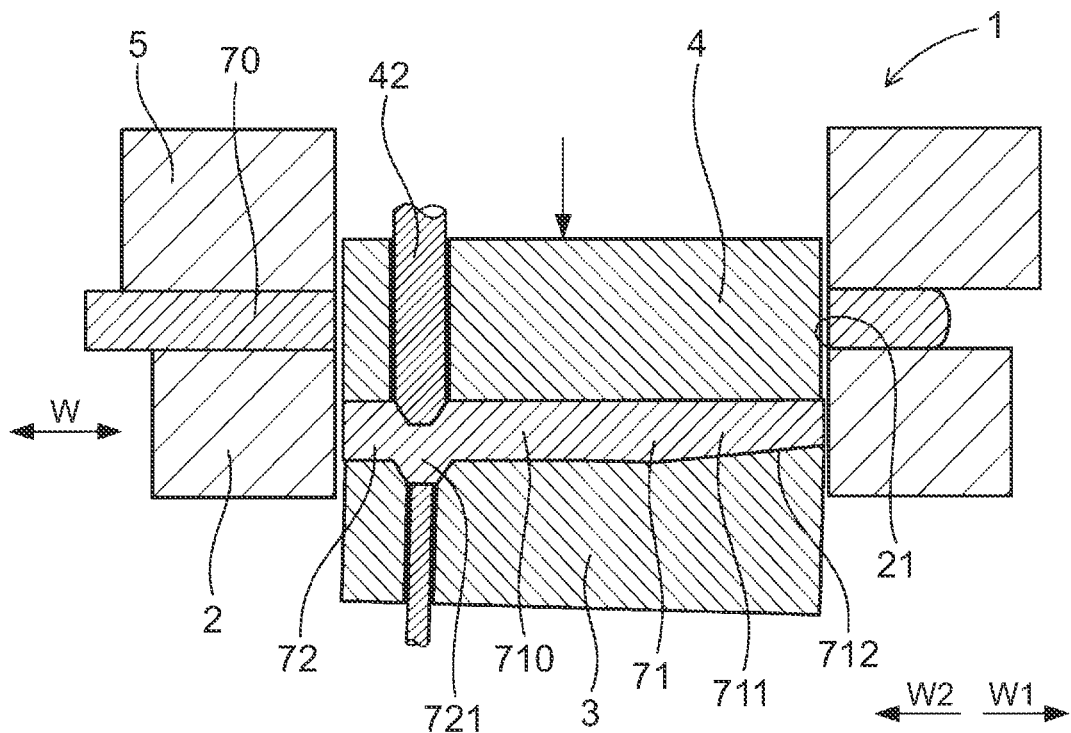
FIG. 6 is a sectional view showing the element blanking apparatus in which an element has been blanked according to the embodiment.

As shown in FIGS. 1 and 6, the element blanking apparatus 1 includes: a die 2 having a blanking blade 21 that has an opening shape conforming to the planar shape of the element 7 to be formed; an ejector 3 that has a sectional shape conforming to the opening shape of the blanking blade 21 and is located inside the blanking blade 21; a punch 4 that has a sectional shape conforming to the opening shape of the blanking blade 21 and moves downward into the blanking blade 21 to blank the element 7 together with the blanking blade 21; and a pusher 5 that is located around the punch 4 and presses the flat plate-like material 70 against the die 2.

As shown in FIG. 1, an upper surface 30 of the ejector 3 has a body portion-side upper surface portion 31 in a region that is located on one side W1 in the lateral direction and that is used to form the body portion 71, and a head portion-side upper surface portion 32 in a region that is located on the other side W2 in the lateral direction and that is used to form the head portion 72 and the neck portion 73. The body portion-side upper surface portion 31 has a raised surface 311 in a region located on the one side W1 in the lateral direction, and the raised surface 311 is tilted upward toward the one side W1 in the lateral direction.

As used herein, the "one side W1 in the lateral direction" refers to one side in the direction perpendicular to the downward direction in which the punch 4 and the pusher 5 move. The "other side W2 in the lateral direction" refers to the opposite side to the one side W1 in the lateral direction.

Figure 2:
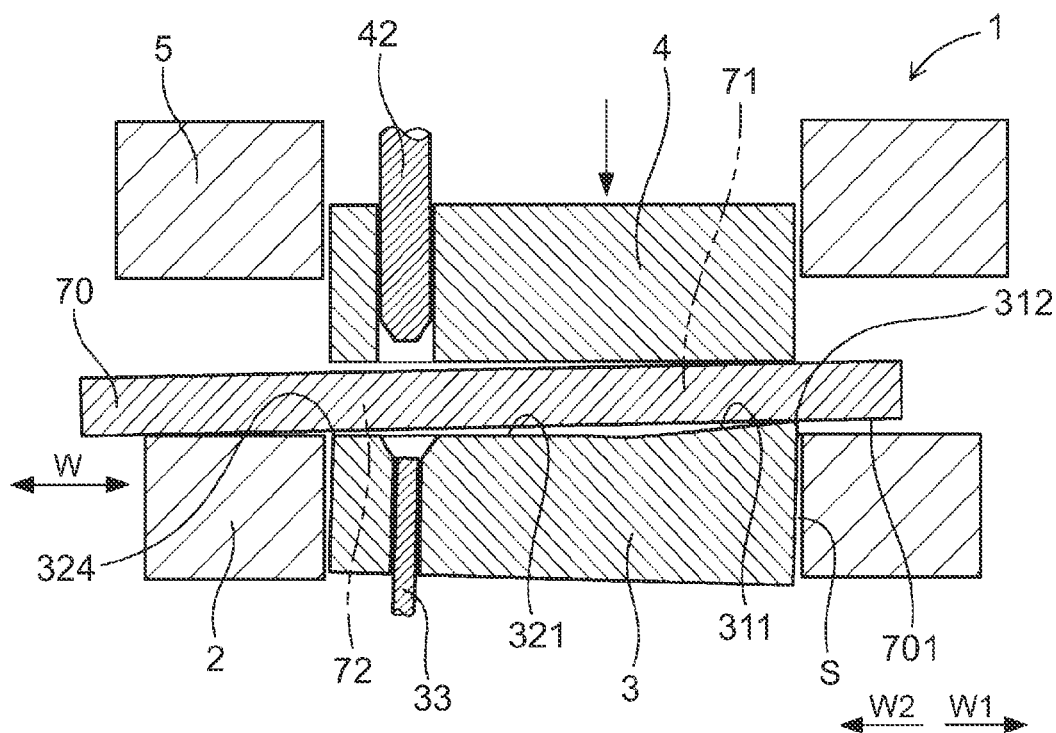
FIG. 2 is a sectional view showing the element blanking apparatus in which the punch has been moved downward according to the embodiment.
Figure 3:
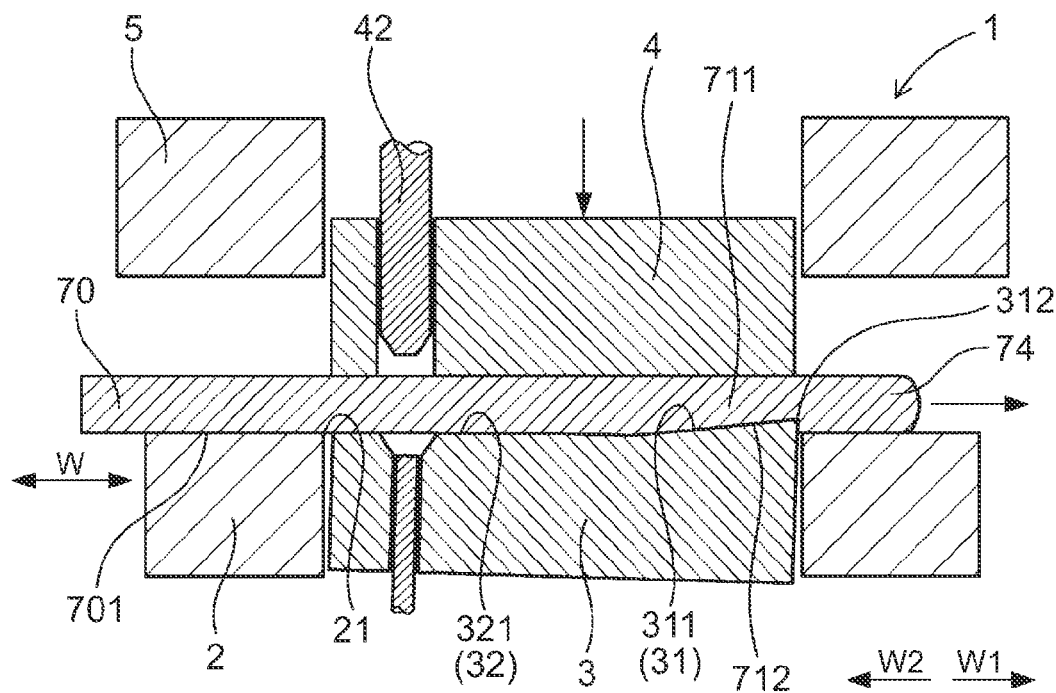
FIG. 3 is a sectional view showing the element blanking apparatus in which a reduced thickness portion has been formed according to the embodiment.
Figure 4:
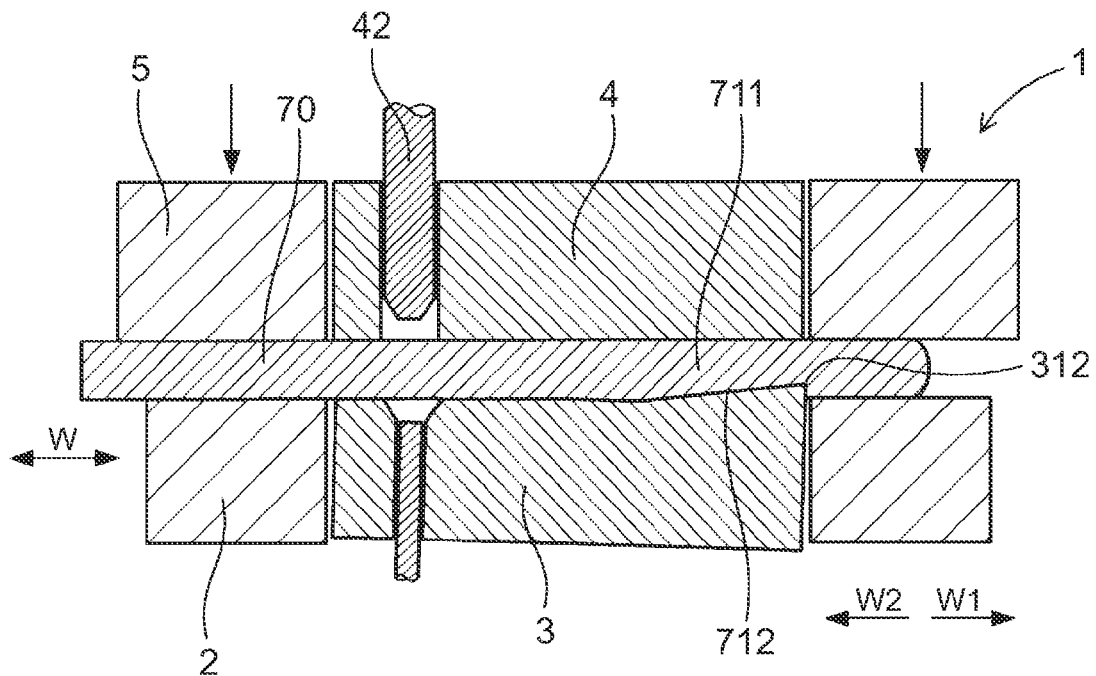
FIG. 4 is a sectional view showing the element blanking apparatus in which the pusher has been moved downward according to the embodiment.

As shown in FIGS. 2 and 3, the element blanking apparatus 1 moves the punch 4 downward to press the flat plate-like material 70 by the punch 4 and the ejector 3, and thus forms a reduced thickness portion 711 in a lower surface 701 of the flat plate-like material 70 by the body portion-side upper surface portion 31 so that the thickness of the reduced thickness portion 711 gradually decreases toward the one side W1 in the lateral direction. Then, as shown in FIG. 4, the element blanking apparatus 1 moves the pusher 5 downward to press the flat plate-like material 70 against the die 2 by the pusher 5, and subsequently, as shown in FIG. 6, blanks the element 7 by the punch 4 and the blanking blade 21.

The element blanking apparatus 1 and the element blanking method according to the present embodiment will be described in detail below with reference to FIGS. 1 to 11.

FIGS. 1 to 6 are sectional views schematically showing the element blanking apparatus 1 as viewed in the feed direction of the flat plate-like material 70.

The element blanking apparatus 1 of the present embodiment successively performs formation of the reduced thickness portion 711 as a portion having a thickness varied with respect to that of a normal thickness portion 710, and blanking of the planar shape of the element 7 (see FIG. 9).

Figure 8:
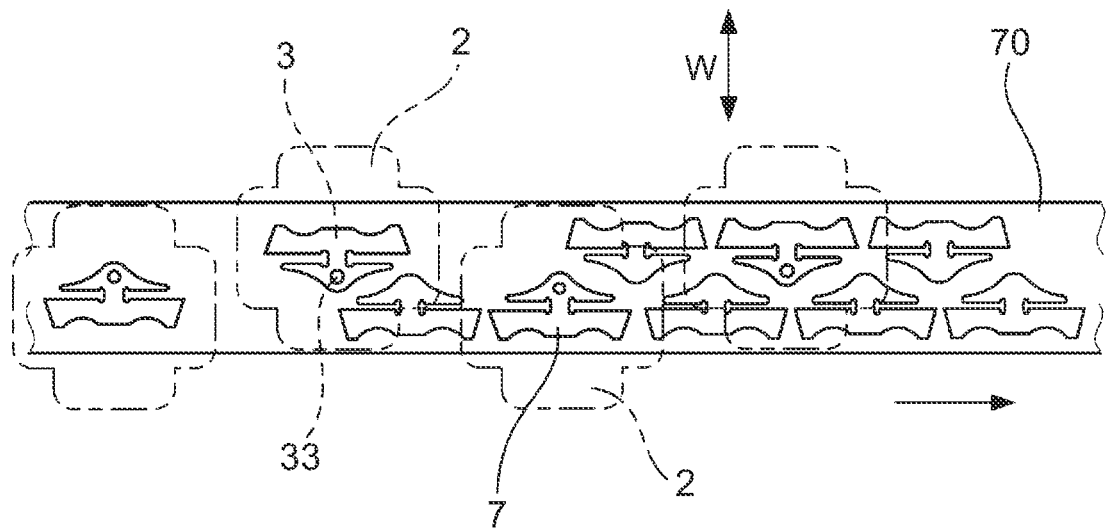
FIG. 8 is a plan view schematically showing the state where multiple elements are blanked from a long strip-shaped material.

As shown in FIGS. 1 and 8, the flat plate-like material 70 of the present embodiment is a long strip-shaped material 70 that is continuously fed between the die 2 and the ejector 3 and the punch 4 and the pusher 5. The long strip-shaped material 70 is sequentially fed between the die 2 and the ejector 3 and the punch 4 and the pusher 5 from a material body wounded in in a spiral pattern, at predetermined intervals at which the element 7 is repeatedly blanked.

The element blanking apparatus 1 of the present embodiment blanks the elements 7 in two rows with their head portions 72 facing inward in the lateral direction W of the long strip-shaped material 70. As shown in FIG. 3, the element blanking apparatus 1 forms the reduced thickness portion 711 by causing a part of the long strip-shaped material 70 to escape into its outer end in the lateral direction W.

As shown in FIG. 9, in the element 7, the head portion 72 has a substantially triangular shape whose width gradually decreases toward the side away from the body portion 71, and the body portion 71 has a substantially trapezoidal shape whose width slightly decreases toward the side away from the head portion 72. A clearance 79 is formed on both sides of the neck portion 73 so as to be located between the head portion 72 and the body portion 71, and the CVT belt hoop 81 is placed in each clearance 79. The hoop 81 is formed by stacking multiple ring-shaped steel plates.

Figure 11:
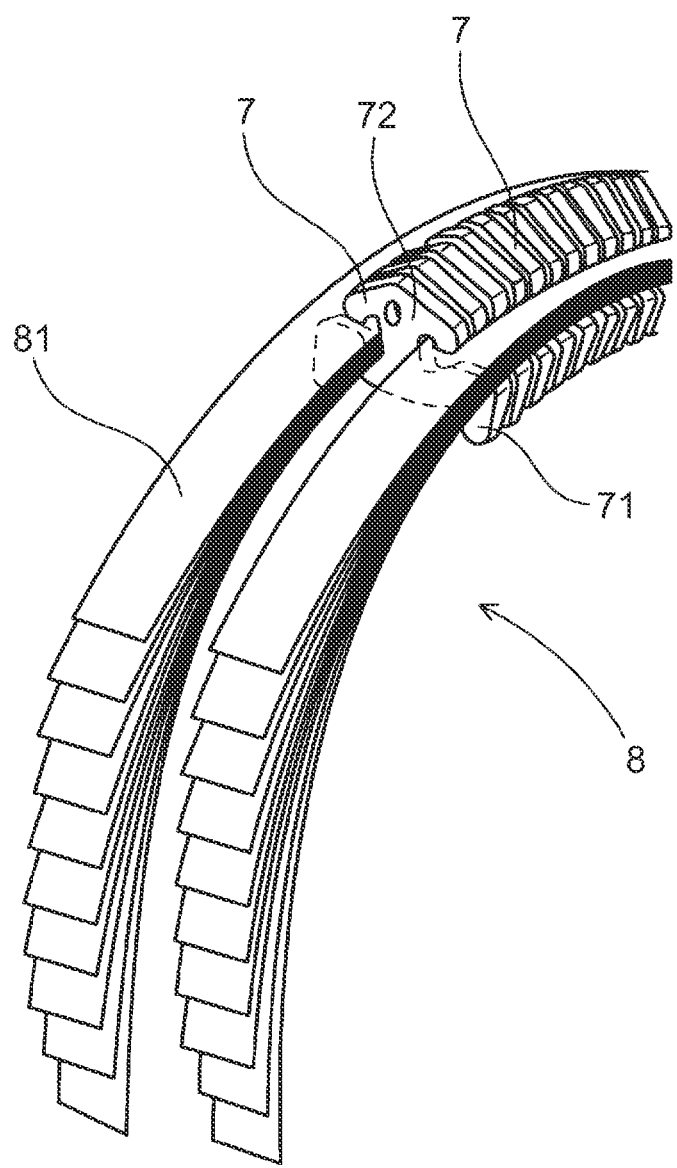
FIG. 11 is a perspective view showing a CVT belt formed by using the elements and a hoop according to the embodiment.

As shown in FIG. 11, a CVT belt 8 is formed by arranging a large number of elements 7 as friction parts along the entire circumference of the CVT belt hoop 81. The CVT belt 8 is wound around a pair of pulleys and is used in continuously variable transmissions (belt-type CVTs).

Figure 10:
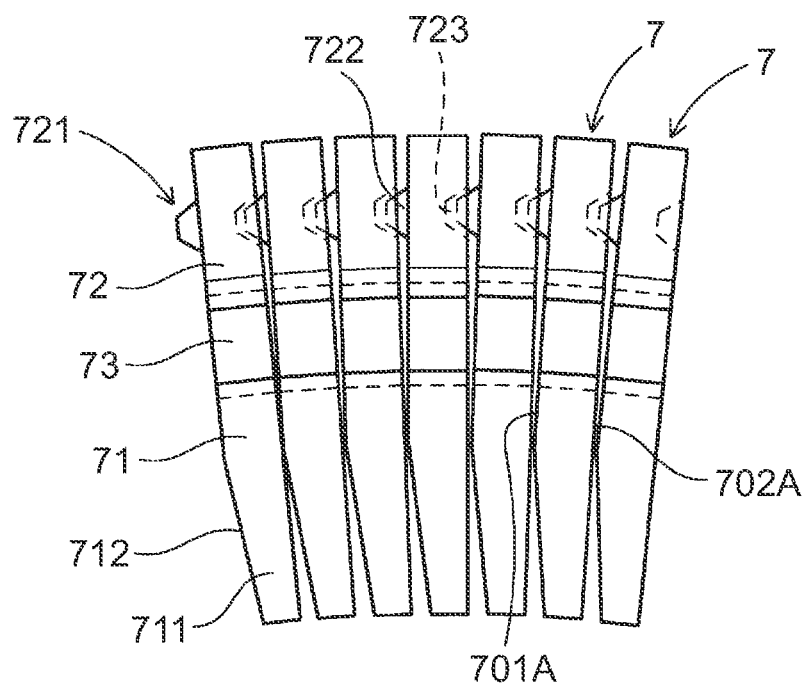
FIG. 10 is a side view showing a stack of elements according to the embodiment.

As shown in FIGS. 9 and 10, each element 7 has a positioning portion 721 at a central position in the lateral direction of the head portion 72 so that adjoining ones of the elements 7 are positioned with respect to each other when the elements 7 are stacked along the entire circumference of the hoop 81. In the element 7, this positioning portion 721 is formed by a positioning protrusion 722 protruding from a taper forming planar surface 701A having a tapered surface 712 of the reduced thickness portion 711, and a positioning recess 723 formed in a flat planar surface 702A located on the opposite side to the taper forming planar surface 701A. The taper forming planar surface 701A is a surface formed by the lower surface 701 of the flat plate-like material 70 that is fed to the element blanking apparatus 1.

The elements 7 are positioned with respect to each other by placing the elements 7 so that the flat planar surface 702A of the adjoining element 7 faces the taper forming planar surface 701A of each element 7 and by inserting the positioning protrusion 722 on the taper forming planar surface 701A of the adjoining element 7 into the positioning recess 723 on the flat planar surface 702A of each element 7.

Figure 7:
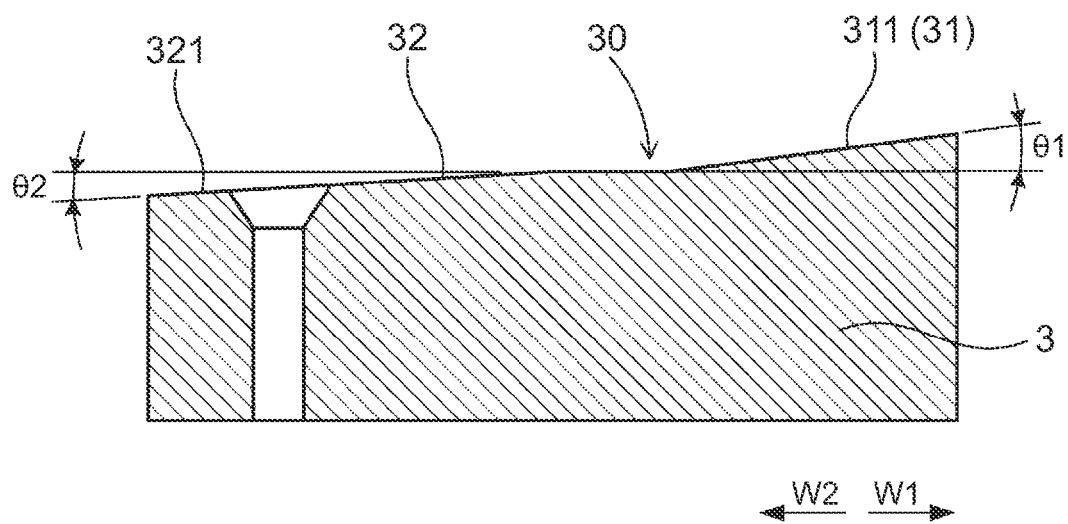
FIG. 7 is a sectional view showing an ejector according to the embodiment.

As shown in FIG. 7, the raised surface 311 of the present embodiment is formed as a tapered surface that is tilted upward toward the one side W1 in the lateral direction. The tilt angle θ1 of the raised surface 311 can be, e.g., 3 to 6° with respect to the lateral direction (horizontal direction). The raised surface 311 may be, e.g., a smoothly bending (curved) tapered surface instead of the linear tapered surface 712.

The raised surface 311 can be formed by a stepped shape by raising the flat surface of the body portion-side upper surface portion 31, which is located on the other side W2 in the lateral direction, higher than the flat surface of the body portion-side upper surface portion 31, which is located on the one side W1 in the lateral direction.

In the ejector 3, the head portion-side upper surface portion 32 has a lowered surface 321 in a region located on the other side W2 in the lateral direction, and the lowered surface 321 is tilted downward toward the other side W2 in the lateral direction. The tilt angle θ2 of the lowered surface 321 can be, e.g., 0.2 to 0.8° with respect to the lateral direction (horizontal direction). The element blanking apparatus 1 is configured so that the lowered surface 321 faces the lower surface 701 of the long strip-shaped material 70 when the body portion-side upper surface portion 31 contacts the lower surface 701 of the long strip-shaped material 70 and the ejector 3 is tilted in a clearance S between the ejector 3 and the blanking blade 21 so as to be lowered on the one side W1 in the lateral direction.

Forming the lowered surface 321 can make the boundary region between the reduced thickness portion 711 and the remaining normal thickness portion 710 of the body portion 71 thicker than the head portion 72 and the neck portion 73, so that an edge having the largest thickness (an angled portion formed between the tapered surface of the reduced thickness portion 711 and the flat surface of the normal thickness portion 710) can be formed in this boundary region. Alternatively, this edge may not be formed and the boundary region may have the same thickness as the head portion 72 and the neck portion 73 (see FIG. 9).

As shown in FIG. 1, a protrusion forming recessed portion 322 that is used to form the positioning protrusion 722 is formed in the head portion-side upper surface portion 32 of the upper surface 30 of the ejector 3, and a lower placement hole 323 in which a knockout pin 33 is placed is formed below the protrusion forming recessed portion 322.

The punch 4 has an upper placement hole 41 at a position located above the knockout pin 33 and facing the knockout pin 33. A punch pin 42 that presses an upper surface 702 of the long strip-shaped material 70 to form the positioning recess 723 is placed in the upper placement hole 41.

The element blanking apparatus 1 of the present embodiment moves the punch 4 and the pusher 5 downward to form the reduced thickness portion 711, then moves the punch pin 42 downward to form the positioning portion 721, and subsequently moves the punch 4 further downward to blank the element 7.

The ejector 3 is subjected to an upward pressing force, and is pressed and moved downward by the punch 4 subjected to a larger pressing force than this pressing force.

A method for blanking the element 7 from the long strip-shaped material by using the element blanking apparatus 1 will be described below.

As shown in FIG. 1, the long strip-shaped material 70 is continuously fed into the clearance formed between the die 2 and the ejector 3 and the punch 4 and the pusher 5.

When forming the element 7, the punch 4 is moved downward. As shown in FIG. 2, as the long strip-shaped material 70 is pressed downward by the punch 4, an upper end angled portion 312 located on the one side W1 in the lateral direction of the raised surface 311 of the body portion-side upper surface portion 31 of the upper surface 30 of the ejector 3 contacts the lower surface 701 of the long strip-shaped material 70. At this time, the raised surface 311 of the ejector 3 is pressed by the long strip-shaped material 70, whereby the ejector 3 is tilted in the clearance S between the ejector 3 and the blanking blade 21 so as to be lowered on the one side W1 in the lateral direction, namely on the side the raised surface 311 is located. The long strip-shaped material 70 is also pressed by the raised surface 311 and is slightly deformed.

Since the upper surface 30 of the ejector 3 has the lowered surface 321 in the head portion-side upper surface portion 32, an angled portion 324 located on the other side W2 in the lateral direction of the ejector 3 does not contact the lower surface 701 of the long strip-shaped material 70 at this time, and the lowered surface 321 can be made to face the lower surface 701 of the long strip-shaped material 70. Thus, the angled portion 324 located on the other side W2 in the lateral direction does not deform the long strip-shaped material 70 at a position where the head portion 72 is to be formed. This can prevent variation in thickness of the head portion 72 of the element 7 to be formed.

As shown in FIG. 3, the long strip-shaped material 70 is then pressed by the punch 4 and the ejector 3, whereby the tapered surface 712 is formed in the lower surface 701 of the long strip-shaped material 70 by the raised surface 311 of the body portion-side upper surface portion 31. The reduced thickness portion 711 whose thickness gradually decreases toward the one side W1 in the lateral direction is formed in the long strip-shaped material 70 by formation of the tapered surface 712.

At this time, a part 74 of the long strip-shaped material 70 which is compressed by the raised surface 311 can be made to flow so as to escape into the outer end in the lateral direction W (the end on the one side W1 in the lateral direction). Thus, the long strip-shaped material 70 can be made to partially and smoothly flow when the reduced thickness portion 711 is formed, which facilitates formation of the reduced thickness portion 711.

Then, as shown in FIG. 4, after the long strip-shaped material 70 is pressed by the punch 4, the long strip-shaped material 70 is pressed against the upper surface 30 of the die 2 by the pusher 5. The lower surface of the pusher 5 may be located higher than the lower surface of the punch 4, and the pusher 5 may be moved downward as the punch 4 is moved downward. In this case, after the long strip-shaped material 70 is pressed by the punch 4, the pusher 5 can be moved further downward to press the long strip-shaped material 70 against the die 2.

Figure 5:
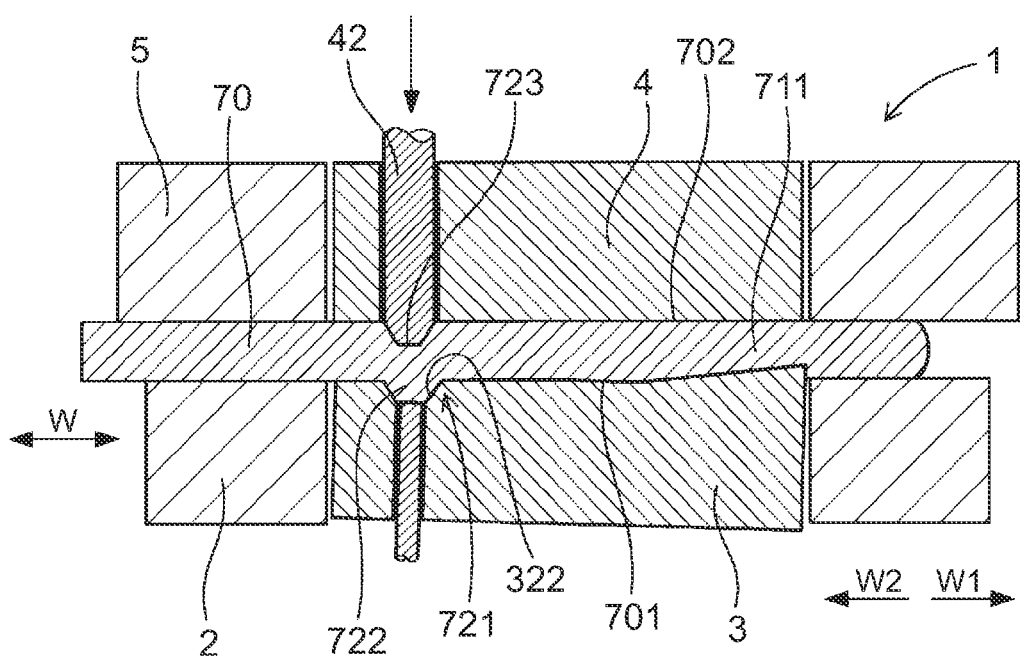
FIG. 5 is a sectional view showing the element blanking apparatus in which a positioning portion has been formed according to the embodiment.

Thereafter, as shown in FIG. 5, the punch pin 42 is moved downward. A part of the long strip-shaped material 70 which is pressed downward by the punch pin 42 is caused to flow downward into the protrusion forming recessed portion 322 of the ejector 3. Thus, the positioning recess 723 is formed in the upper surface 702 of the long strip-shaped material 70, and the positioning protrusion 722 is formed on the lower surface 701 of the long strip-shaped material 70.

Subsequently, as shown in FIG. 6, the punch 4 is moved further downward. At this time, the pressing force of the punch 4 is larger than that of the ejector 3. Therefore, as the punch 4 is moved downward, the ejector 3 is moved downward accordingly with respect to the die 2 and the pusher 5, and the element 7 is blanked from the long strip-shaped material 70 by the punch 4 and the blanking blade 21 of the die 2.

Then, the punch 4 and the ejector 3 are moved upward to their respective predetermined positions, and the knockout pin 33 is moved upward. The formed element 7 can thus be removed from the element blanking apparatus 1.

As described above, in the present embodiment, formation of the reduced thickness portion 711 as the varied thickness portion and blanking of the element 7 can be successively performed in the single element blanking apparatus 1. The element 7 including the head portion 72 having the positioning portion 721, the neck portion 73, and the body portion 71 having the reduced thickness portion 711 can be formed in a short time by a single stroke of the downward movement of the punch 4.

A material having a substantially uniform overall thickness can be used as the long strip-shaped material 70. This can achieve improved productivity such as reduction in cost associated with production of the long strip-shaped material 70.

Moreover, a region around the punch 4 is not pressed by the pusher 5 during formation of the reduced thickness portion 711. This makes it easier for the part of the long strip-shaped material 70, which is pressed to flow upon formation of the reduced thickness portion 711, to flow toward the one side W1 in the lateral direction into the region around the punch 4. The reduced thickness portion 711 can thus be formed without applying an excessive load to the die 2.

The invention claimed is:

1. An element blanking apparatus for blanking from a substantially flat plate material a CVT belt element that is formed by a body portion to be placed on an inner periphery of a CVT belt hoop, a head portion to be placed on an outer periphery of the CVT belt hoop, and a neck portion connecting the head portion and the body portion at a central position, the element blanking apparatus comprising:

a die having a blanking blade that has an opening shape conforming to a planar shape of the element to be formed;

an ejector that has a sectional shape conforming to the opening shape of the blanking blade and is located inside the blanking blade;

a punch that has a sectional shape conforming to the opening shape of the blanking blade and moves downward into the blanking blade to blank the element together with the blanking blade; and a pusher that is located around the punch and presses the flat plate material against the die, wherein an upper surface of the ejector has a body portion-side upper surface portion in a region that is located on one side in a lateral direction and that is used to form the body portion, and a head portion-side upper surface portion in a region that is located on the other side in the lateral direction and that is used to form the head portion and the neck portion, the body portion-side upper surface portion has a raised surface in a region located on the one side in the lateral direction, and the raised surface is raised with respect to a region of the body portion-side upper surface portion which is located on the other side in the lateral direction, the element blanking apparatus moves the punch downward to press the flat plate material by the punch and the ejector, and thus forms a reduced thickness portion in the flat plate material by the body portion-side upper surface portion, then moves the pusher downward to press the flat plate material against the die by the pusher, and subsequently blanks the element by the punch and the blanking blade, the head portion-side upper surface portion has a lowered surface in a region located on the other side in the lateral direction, and the lowered surface is tilted downward toward the other side in the lateral direction, and the lowered surface is caused to face parallel to a lower surface of the flat plate material when the body portion-side upper surface portion contacts the lower surface of the flat plate material and the ejector is tilted in a clearance between the ejector and the blanking blade so as to be lowered on the one side in the lateral direction.

2. The element blanking apparatus according to claim 1, wherein the raised surface is formed so as to be tilted upward toward the one side in the lateral direction, and the reduced thickness portion is formed so that a thickness thereof gradually decreases toward the one side in the lateral direction.

3. An element blanking method for blanking from a substantially flat plate material using an element blanking apparatus a CVT belt element that is formed by a body portion to be placed on an inner periphery of a CVT belt hoop, a head portion to be placed on an outer periphery of the CVT belt hoop, and a neck portion connecting the head portion and the body portion at a central position, wherein the element blanking apparatus includes:

a die having a blanking blade that has an opening shape conforming to a planar shape of the element to be formed, an ejector that has a sectional shape conforming to the opening shape of the blanking blade and is located inside the blanking blade, a punch that has a sectional shape conforming to the opening shape of the blanking blade and moves downward into the blanking blade to blank the element together with the blanking blade, and a pusher that is located around the punch and presses the flat plate material against the die, an upper surface of the ejector has a body portion-side upper surface portion in a region that is located on one side in a lateral direction and that is used to form the body portion, and a head portion-side upper surface portion in a region that is located on the other side in the lateral direction and that is used to form the head portion and the neck portion, the body portion-side upper surface portion has a raised surface in a region located on the one side in the lateral direction, and the raised surface is raised with respect to a region of the body portion-side upper surface portion which is located on the other side in the lateral direction, the method comprising:

moving the punch downward to press the flat plate material by the punch and the ejector so as to form a reduced thickness portion in the flat plate material by the body portion-side upper surface portion;

moving the pusher downward to press the flat plate material against the die by the pusher; and blanking subsequently the element by the punch and the blanking blade, wherein the head portion-side upper surface portion has a lowered surface in a region located on the other side in the lateral direction, and the lowered surface is tilted downward toward the other side in the lateral direction, and the lowered surface is caused to face parallel to a lower surface of the flat plate material when the body portion-side upper surface portion contacts the lower surface of the flat plate material and the ejector is tilted in a clearance between the ejector and the blanking blade so as to be lowered on the one side in the lateral direction.

4. The element blanking method according to claim 3, wherein the raised surface is tilted upward toward the one side in the lateral direction, and the reduced thickness portion is formed so that a thickness thereof gradually decreases toward the one side in the lateral direction.

5. The element blanking method according to claim 4, wherein the flat plate material is a long strip-shaped material that is continuously fed between the die and the ejector and the punch and the pusher, and a plurality of the elements are blanked in two rows with their head portions facing inward in a lateral direction of the long strip-shaped material, and the long strip-shaped material is caused to partially escape into its outer end in the lateral direction upon formation of the reduced thickness portion.

6. The element blanking method according to claim 3, wherein the flat plate material is a long strip-shaped material that is continuously fed between the die and the ejector and the punch and the pusher, and a plurality of the elements are blanked in two rows with their head portions facing inward in a lateral direction of the long strip-shaped material, and the long strip-shaped material is caused to partially escape into its outer end in the lateral direction upon formation of the reduced thickness portion.

* * * * *